United States Patent
Hasegawa et al.

(10) Patent No.: US 6,293,011 B1
(45) Date of Patent: Sep. 25, 2001

(54) HEAT EXCHANGER FOR VEHICLE AIR CONDITIONER

(75) Inventors: Etuo Hasegawa, Nagoya; Yoshifumi Aki, Kariya, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/417,966

(22) Filed: Oct. 13, 1999

(30) Foreign Application Priority Data

Nov. 19, 1998 (JP) .................................................. 10-329797

(51) Int. Cl.[7] .............................. B23P 15/26; F28F 9/16; F16L 41/08
(52) U.S. Cl. .................... 29/890.052; 165/173; 165/178; 285/125.1
(58) Field of Search .................................... 165/153, 173, 165/178, 78; 285/125.1, 133.11, 382

(56) References Cited

U.S. PATENT DOCUMENTS

| 3,874,710 | * | 4/1975 | Courtot | 285/124.3 |
| 5,205,349 | * | 4/1993 | Nagao et al. | 165/153 X |
| 5,240,068 | * | 8/1993 | Tokutake | 165/173 X |
| 5,363,910 | | 11/1994 | Baba et al. | 165/178 X |
| 5,632,332 | * | 5/1997 | Hanafusa | 165/178 |
| 5,771,965 | * | 6/1998 | Inaba et al. | 165/178 |
| 5,806,897 | * | 9/1998 | Nagai et al. | 285/125.1 X |
| 6,059,322 | * | 5/2000 | Nagai et al. | 285/125.1 |

FOREIGN PATENT DOCUMENTS

| 63-127094 | * | 5/1988 | (JP) | 165/178 |
| 4-251195 | | 9/1992 | (JP) | . |
| 4-251196 | | 9/1992 | (JP) | . |
| 5-141580 | * | 6/1993 | (JP) | 285/382 |

* cited by examiner

*Primary Examiner*—Leonard Leo
(74) *Attorney, Agent, or Firm*—Harness, Dickey & Pierce, PLC

(57) ABSTRACT

A heat exchanger has a header tank, plural tubes through which refrigerant flows and a connector for connecting the tank to a pipe. The header tank has a pair of protruding portions protruding from an outer surface of the header tank and integrally formed with the header tank. When the connector is bonded to the tank by brazing, the connector is disposed between the protruding portions, and each of the protruding portions is bent toward the other at a protruding end thereof by plastic deformation. As a result, the connector is clamped by the protruding portions and is fastened to the header tank. Thus, the connector is readily and tentatively fastened to the header tank before bonded to the header tank by brazing.

7 Claims, 3 Drawing Sheets

HEAT EXCHANGER FOR VEHICLE AIR CONDITIONER

CROSS REFERENCE TO RELATED APPLICATION

This application relates to and claims priority from Japanese Patent Application No. 10-329797 filed on Nov. 19, 1998, the contents of which are hereby incorporated by reference.

BACKGROUND OF THE INVENTION

1. Field of the Invention

The present invention relates to a heat exchanger and is suitably applied to a condenser or radiator of a refrigerant cycle for a vehicle air conditioner.

2. Related Art

Recently, a condenser for a refrigerant cycle shifts from a serpentine type heat exchanger to a multi-flow type heat exchanger. The serpentine type heat exchanger has a heater core formed by bending a single tube into a zigzag shape. The multi-flow type heat exchanger has a header tank disposed at one side ends of plural tubes in a longitudinal direction of the tubes. In the multi-flow type, the tubes, the header tank and a connector for connecting the header tank to a pipe are bonded with each other by brazing. Therefore, the parts need to be tentatively fastened to each other before bonding by brazing. Especially, the connector needs to be restricted from releasing from the header tank.

As shown in FIG. 6, JP-A-4-251195 discloses a heat exchanger in which an end of one of plural tubes 211 is clamped by a connector 230 in a header tank 220, thereby tentatively fastening the connector 230 to the header tank 220. However, fluid flowing through the connector 230 into the header tank 220 may mainly flow into the clamped tube 211. As a result, an amount of fluid distributed to each tube 211 becomes ununiform, and heat exchange performance of the heat exchanger is declined. Further, a passage formed inside the clamped tube 211 may be closed by the connector 230. As a result, an amount of fluid distributed to each tube 211 becomes ununiform.

As shown in FIG. 7, JP-A-4-251196 discloses another heat exchanger in which a connector 330 penetrates the header tank 320 to be tentatively fastened to the header tank 320. However, in this case, a flow amount of fluid in the header tank 320 may largely differ between both sides of the connector 330, i.e., between an upper side and a lower side of the connector 330 in FIG. 7. Therefore, the connector 330 needs to be disposed at a longitudinal end of the header tank 320, and design of the heat exchanger is restricted.

SUMMARY OF THE INVENTION

In view of the foregoing problems, it is an object of the present invention to provide a heat exchanger in which a connector is tentatively fastened to a header tank before bonded to the header tank by brazing without causing decline in heat exchange performance nor design restriction.

According to the present invention, a heat exchanger has plural tubes through which fluid flows, a tank communicating with the tubes, a connector for connecting the tank to a pipe and a protruding portion protruding from an outer surface of the tank. The connector is clamped by the protruding portion and is tentatively fastened to the tank. As a result, the connector is readily and tentatively fastened to the header tank before bonded to the header tank by brazing, without causing decline in heat exchange performance nor design restriction of the heat exchanger.

Preferably, the protruding portion is integrally formed with the tank by any one of extrusion and drawing. As a result, the number of manufacturing processes of the tank is reduced.

Preferably, the protruding portion includes a pair of clamping portions, and the connector is disposed between the clamping portions to be clamped by the clamping portions.

BRIEF DESCRIPTION OF THE DRAWINGS

This and other objects and features of the present invention will become more readily apparent from a better understanding of the preferred embodiment described below with reference to the accompanying drawings, in which.

DETAILED DESCRIPTION OF THE PREFERRED EMBODIMENT

A preferred embodiment of the present invention is described hereinafter with reference to the accompanying drawings.

Figure 1:
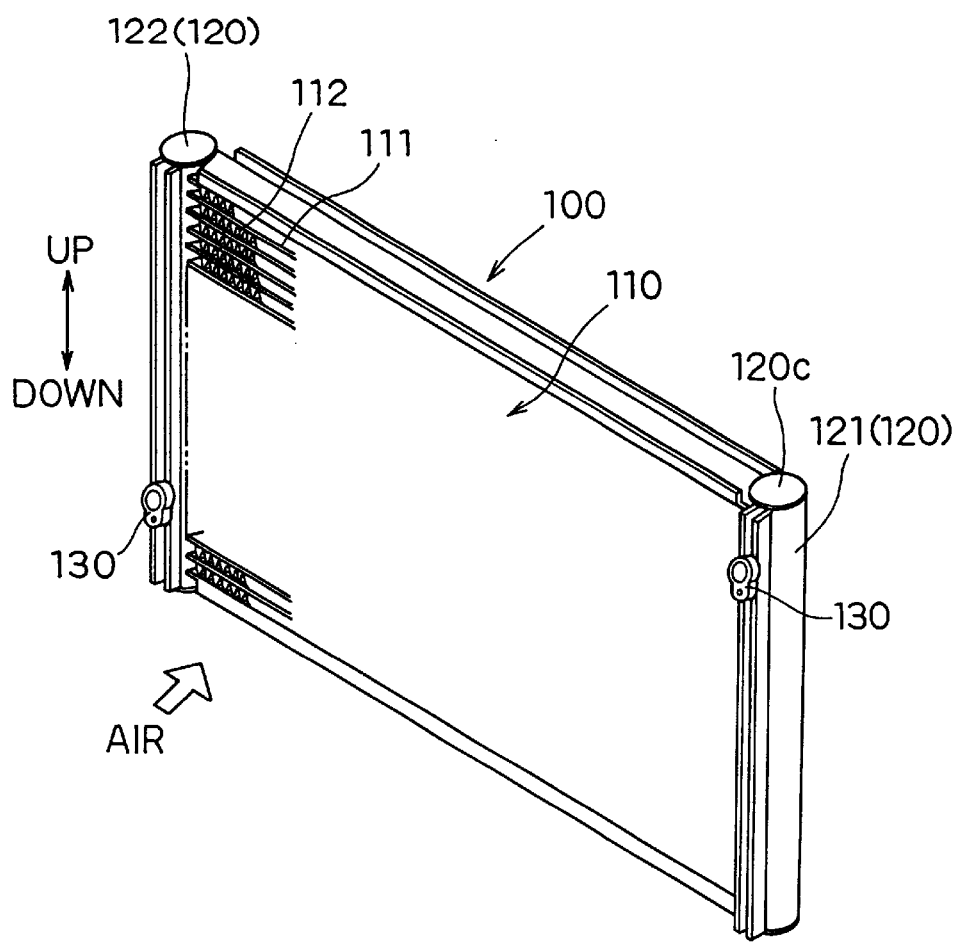
FIG. 1 is a schematic perspective view showing a radiator of a refrigerant cycle for a vehicle according to a preferred embodiment of the present invention.

In the embodiment, the present invention is typically applied to a radiator of a refrigerant cycle for a vehicle using carbon dioxide as refrigerant. As shown in FIG. 1, a radiator 100 has plural flat tubes 111 forming plural passages (not shown) through which refrigerant flows. Each of the flat tubes 111 is formed by extrusion or drawing using aluminum. Plural corrugated fins 112 are disposed between adjacent flat tubes 112. The flat tubes 111 and the corrugated fins 112 form a heater core 110 which performs heat exchange between refrigerant and air. The flat tubes 111 and the corrugated fins 112 are bonded to each other using brazing material clad on both side surfaces of the flat tubes 111 or the fins 112.

The radiator 100 also has first and second header tanks 121 and 122 respectively disposed on each end of the flat tubes 111 in a longitudinal direction of the flat tubes 111. Each of the first and second header tanks 121, 122 is extending in a direction perpendicular to the longitudinal direction of the flat tubes 111 and communicating with each of the flat tubes 111. Refrigerant flowing into the first header tank 121 is distributed to each of the flat tubes 112. After heat exchange, refrigerant from each of the flat tubes 111 is collected into the second header tank 122. The first header tank 121 is connected to an outlet of a compressor (not shown) of the refrigerant cycle through a pipe, and the second header tank 122 is connected to an inlet of a decompressor (not shown) of the refrigerant cycle through a pipe. Hereinafter, the first and second header tanks 121, 122 are collectively referred to as a tank 120.

Figure 2:
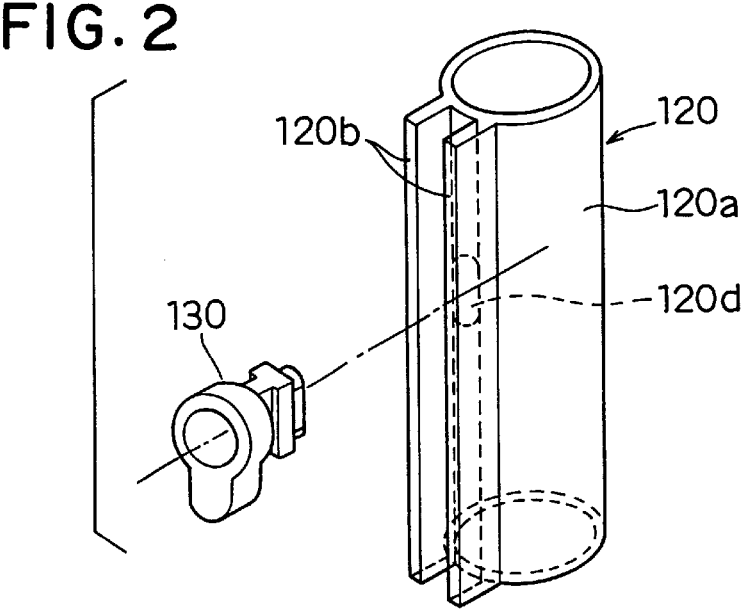
FIG. 2 is a perspective view showing a header tank and a connector of the radiator according to the embodiment.

As shown in FIG. 2, the tank 120 has a cylindrical tank main portion 120a and two protruding portions 120b protruding from an outer surface of the tank main portion 120a to extend in a longitudinal direction of the tank main portion 120a. The protruding portions 120b form a recess portion therebetween. The recess portion has a bottom formed by the outer surface of the tank main portion 120a, and is opened at protruding ends of the protruding portions 120b. The tank main portion 120a and the protruding portions 120b are integrally formed by extrusion or drawing. In the embodiment, the tank main portion 120a and the protruding portions 120b are formed by extrusion. As shown in FIG. 1, each end of the tank main portion 120a in the longitudinal direction thereof is closed by a lid 120c formed into a circular plate. The lid 120c is bonded to each end of the tank 120 in the longitudinal direction thereof by brazing.

Figure 3:
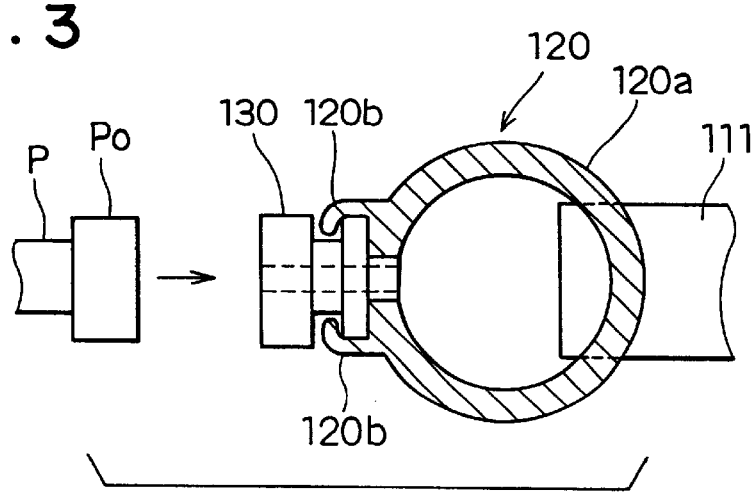
FIG. 3 is a cross-sectional view showing a fastening structure of the connector to the header tank according to the embodiment.

The tank 120 is connected to a pipe P through a connector 130. As shown in FIG. 3, the connector 130 is disposed in the recess portion formed by the protruding portions 120b to be outside a passage defined by the tank main portion 120a. Each of the protruding portions 120b is bent toward the other at a protruding end thereof by plastic deformation. As a result, the connector 130 is clamped by the protruding portions 120b and is fastened between the protruding portions 120b. Thereafter, a connector $P_0$ attached to an end of the pipe P is connected to the connector 130 using a bolt (not shown), thereby connecting the pipe P to the connector 130.

Referring back to FIG. 2, the tank main portion 120a has an insertion hole 120d to which the connector 130 is partially inserted. Therefore, the connector 130 is bonded to the tank 120 using brazing material applied or sprayed to the connector 130, while the connector 130 is partially inserted into the insertion hole 120d and is fastened by the protruding portions 120b.

According to the present embodiment, the connector 130 is tentatively fastened to the tank 120 by plastic deformation of the protruding portions 120b formed on the outer surface of the tank 120. Therefore, refrigerant flowing into the tank 120 through the connector 130 does not mostly flow into one of the flat tubes 111, unlike a heat exchanger in which a tube is clamped by a connector in a tank thereby making refrigerant mostly flow into the clamped tube. As a result, refrigerant is substantially uniformly distributed into each of the flat tubes 111, and heat exchange performance of the radiator 100 is restricted from declining. Further, in the present embodiment, any passage of the tubes 111 is not closed by the connector 130, while in the heat exchanger in which the tube is clamped by the connector, a passage of the tube clamped by the connector may be closed by the connector. Therefore, heat exchange performance of the radiator 100 is restricted from declining.

Further, in the present embodiment, the connector 130 is tentatively fastened to the tank 120 outside the tank 120 without penetrating the tank 120. Therefore, a flow amount of refrigerant in the tank 120 does not largely differ between an upper side and a lower side of the connector 130 in FIG. 2, unlike a heat exchanger in which a connector penetrates a tank thereby making a flow amount of refrigerant in the tank largely differ between an upper side and a lower side of the connector. As a result, the connector 130 can be disposed at any position along the protruding portions 120b on the tank 120, and the radiator 100 is designed more freely.

Thus, the connector 130 is readily and tentatively fastened to the tank 120 of the radiator 100 from outside the tank 120 before bonded to the tank 120 by brazing, while the radiator 100 has excellent heat exchange performance and little design restriction.

Further, according to the embodiment, the protruding portions 120b and the tank main portion 120a are integrally formed by extrusion. Therefore, the protruding portions 120b are formed simultaneously with the tank main portion 120a, thereby reducing the number of manufacturing processes of the tank 120. Further, since the tank main portion 120a is integrally formed into a cylindrical shape, the tank main portion 120a has excellent pressure resistance.

Figure 4:
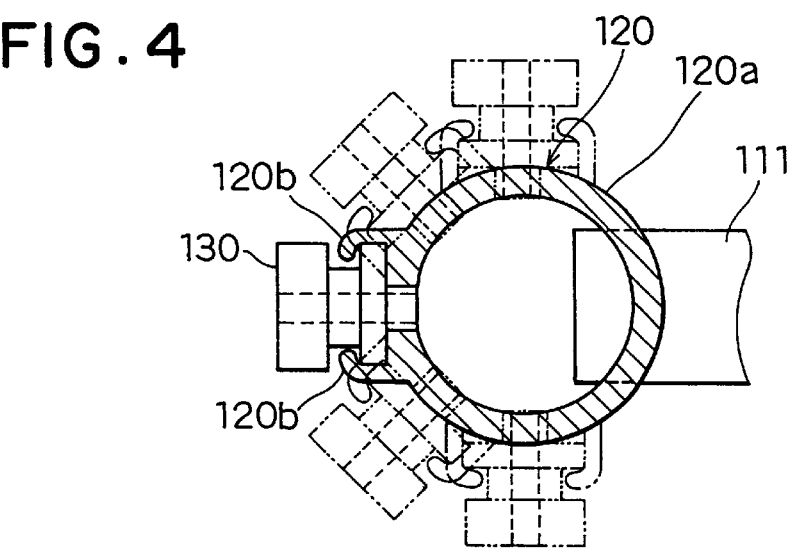
FIG. 4 is a cross-sectional view showing various fastening positions of the connector to the header tank according to a modification of the embodiment.

In the above-mentioned embodiment, the protruding portions 120b are formed on the outer surface of the tank 120 at an upstream air side. However, as shown in FIG. 4, the protruding portions 120b may be formed at any position on the outer surface of the tank 120.

In the above-mentioned embodiment, the protruding portions 120b are formed along a whole longitudinal length of the tank main portion 120a. However, the protruding portions 120b may be partially formed in the longitudinal direction of the tank main portion 120a at a position where the connector 130 is bonded.

In the above-mentioned embodiment, the tank main portion 120a and the protruding portions 120b are integrally formed by extrusion or drawing; however, the tank main portion 120a and the protruding portions 120b may be separately formed and then bonded to each other.

In the above-mentioned embodiment, the tank main portion 120a is integrally formed by extrusion or drawing; however, the tank main portion 120a may be formed by bonding a core plate portion to which the tubes 111 are connected and a tank main portion.

In the above-mentioned embodiment, brazing material is applied or sprayed to the connector 130; however, brazing material may be applied or sprayed to the tank 120.

Figure 5A:
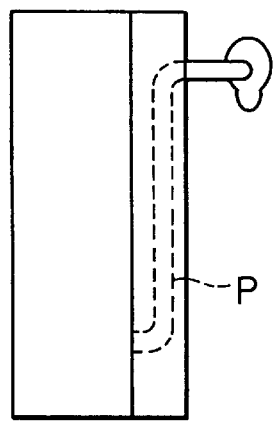
FIGS. 5A and 5B are schematic views showing a pipe fastened by protruding portions of the tank according to another modification of the embodiment.
Figure 5B:
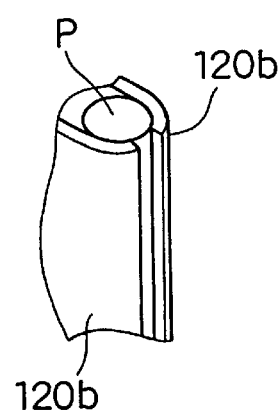
Figure 6:
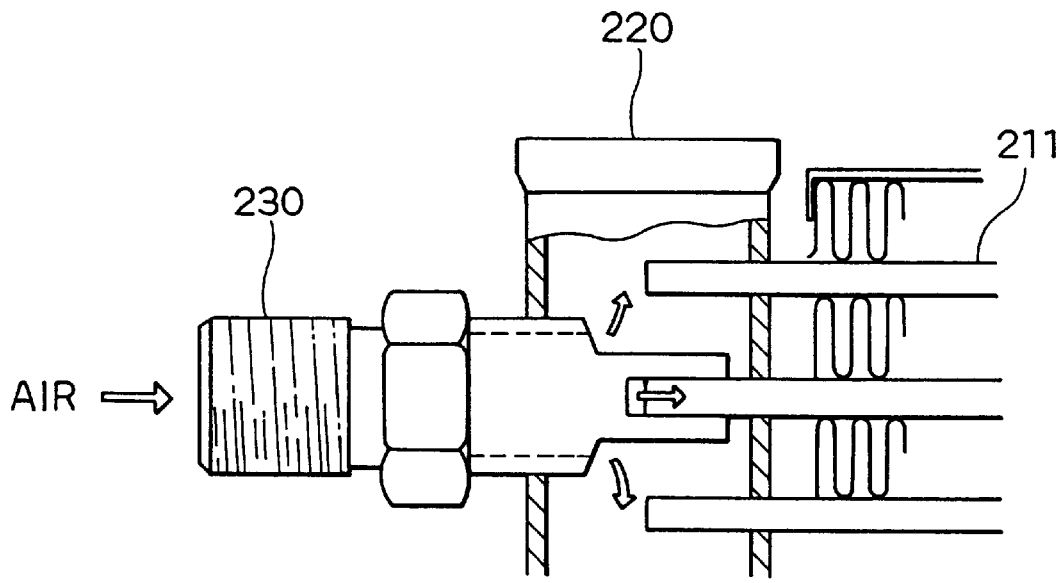
FIG. 6 is a cross-sectional view showing a fastening structure of a connector to a header tank in a conventional heat exchanger.
Figure 7:
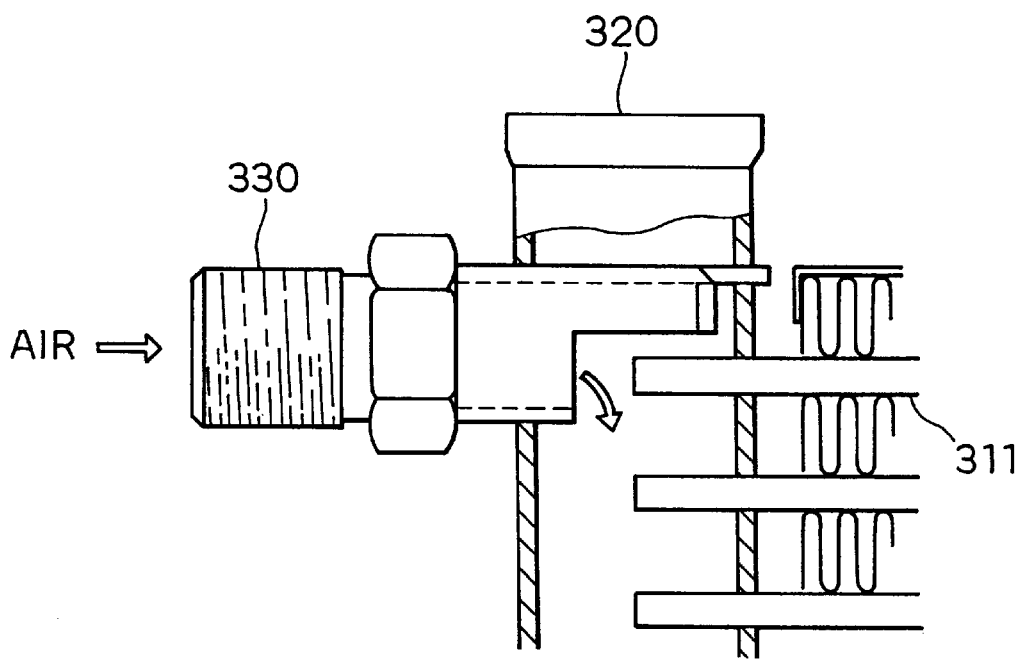
FIG. 7 is a cross-sectional view showing a fastening structure of a connector to a header tank in another conventional heat exchanger.

In the above-mentioned embodiment, the connector 130 is clamped by the protruding portions 120b and is fastened to the tank 120; however, as shown in FIGS. 5A and 5B, the pipe P may be clamped by the protruding portions 120b and is fastened to the tank 120.

Further, in the above-mentioned embodiment, a bracket may be attached to the protruding portions 120b so that the radiator 100 is mounted on a vehicle or the like through the bracket.

In the above-mentioned embodiment, the present invention is applied to the radiator of the vehicle refrigerant cycle; however, the present invention is not limited to this, but is applied to any other heat exchanger.

Although the present invention has been fully described in connection with a preferred embodiment thereof with reference to the accompanying drawings, it is to be noted that various changes and modifications will become apparent to those skilled in the art.

Such changes and modifications are to be understood as being within the scope of the present invention as defined by the appended claims.

What is claimed is:

1. A heat exchanger to be connected to a pipe, said heat exchanger comprising:

a plurality of tubes through which fluid flows, each of said tubes extending in a longitudinal direction;

a tank disposed at one side end of said tubes in the longitudinal direction to extend in an extending direction perpendicular to the longitudinal direction and to communicate with said tubes;

a connector for connecting said tank to said pipe; and a protruding portion protruding from an outer surface of said tank, for clamping said connector so that said connector is immovably fastened to said tank, wherein:

said protruding portion has first and second clamping portions which are formed unitarily with said tank in parallel with each other to extend in the extending direction of said tank from one end to the other end of said tank;

each of said first and second clamping portions has a length approximately equal to that of said tank in the extending direction;

said first and second clamping portions protrude from the outer surface of said tank in parallel with each other to have the same protruding dimension and to form a recess portion therebetween; and said connector is disposed in said recess portion to be outside a passage defined by said tank.

2. The heat exchanger according to claim 1, wherein:

said first clamping portion is bent toward said second clamping portion at a protruding end thereof; and said second clamping portion is bent toward said first clamping portion at a protruding end thereof.

3. The heat exchanger according to claim 2, wherein said first and second clamping portions are bent by plastic deformation.

4. The heat exchanger according to claim 1, wherein each of said first and second clamping portions has a rectangular flat shape.

5. The heat exchanger according to claim 1, wherein:

said tank has an insertion hole between said first and second clamping portions; and a part of said connector is disposed in said insertion hole.

6. The heat exchanger according to claim 1, wherein said tank has a closed sectional shape with a smooth inner surface, in a direction perpendicular to the extending direction of said tank.

7. A method for bonding a connector to a tank of a heat exchanger, said method comprising steps of:

forming said tank having first and second protruding portions protruding from an outer surface of said tank in parallel with each other to have the same protruding height, each of said first and second protruding portions extending from one end to the other end of said tank to have a length approximately equal to that of said tank;

placing said connector between first and second protruding portions at a position having an insertion hole in said tank so that a part of said connector is inserted into said insertion hole;

bending said first protruding portion toward said second protruding portion at a protruding end thereof so that said connector is clamped by said first protruding portion;

bending said second protruding portion toward said first protruding portion at a protruding end thereof so that said connector is clamped by said second protruding portion; and bonding said connector to said tank by brazing.

\* \* \* \* \*